US008812451B2

(12) United States Patent
Shukla et al.

(10) Patent No.: US 8,812,451 B2
(45) Date of Patent: Aug. 19, 2014

(54) PROGRAMMING MODEL FOR SYNCHRONIZING BROWSER CACHES ACROSS DEVICES AND WEB SERVICES

(75) Inventors: Dharma Shukla, Sammamish, WA (US); Abhay Parasnis, Sammamish, WA (US); Raymond Endres, Seattle, WA (US); Arash Ghanaie-Sichanie, Brothell, WA (US); Israel Hilerio, Kenmore, WA (US); Farookh Mohammed, Woodinville, WA (US); Aditya Bhandarkar, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 406 days.

(21) Appl. No.: 12/402,366

(22) Filed: Mar. 11, 2009

(65) Prior Publication Data

US 2010/0235321 A1    Sep. 16, 2010

(51) Int. Cl.
*G06F 17/30* (2006.01)
(52) U.S. Cl.
USPC ........... 707/661; 707/610; 707/802; 709/226; 709/231
(58) Field of Classification Search
USPC .......................................... 709/231; 707/661
See application file for complete search history.

(56) References Cited

U.S. PATENT DOCUMENTS

| | | | |
|---|---|---|---|
| 6,151,599 A | 11/2000 | Shrader et al. | |
| 6,233,606 B1 | 5/2001 | Dujari | |
| 6,546,554 B1 | 4/2003 | Schmidt et al. | |
| 6,594,682 B2 | 7/2003 | Peterson et al. | |
| 6,615,253 B1 | 9/2003 | Bowman-Amuah | |
| 6,725,262 B1 | 4/2004 | Choquier et al. | |
| 7,080,051 B1 | 7/2006 | Crawford | |
| 7,219,304 B1 | 5/2007 | Kraenzel et al. | |

(Continued)

FOREIGN PATENT DOCUMENTS

| | | |
|---|---|---|
| CN | 101309291 A | 11/2008 |
| CN | 102349062 | 2/2012 |
| WO | 2007/083229 A2 | 7/2007 |
| WO | 2010104659 | 12/2010 |

OTHER PUBLICATIONS

Russer, Michael, "How to Turn Your Web Browser into a Powerful Offline Sales Presentation Tool", Jan. 16, 2009, pp. 1-3, http://realtytimes.com/rtpages/20020418_offlineprez.htm.

(Continued)

*Primary Examiner* — Belix M Ortiz Ditren
(74) *Attorney, Agent, or Firm* — Bryan Webster; Andrew Sanders; Micky Minhas (57) ABSTRACT

A computer user may use a computing environment comprising a set of computers that respectively feature a web browser having a browser cache containing many types of data objects, including application resources and user-generated data files. However, the contents of a browser cache significantly contribute to the computing environment of a computer, and the computing environments presented by each computer may diverge, providing an inconsistent computing environment. Instead, the contents of browser caches of the computers comprising the computing environment may be synchronized across computers. Additionally, the browser cache may be synchronized with the other data objects of a computing environment (such as relevant portions of the filesystem); the synchronizing may be implemented as an out-of-browser process executing independently of the applications, and even when the browser is not executing; and the synchronization may be exposed through a programmatic access with which web applications may interact.

20 Claims, 6 Drawing Sheets

(56) References Cited

U.S. PATENT DOCUMENTS

| | | | |
|---|---|---|---|
| 7,263,712 | B2 | 8/2007 | Spencer |
| 7,272,782 | B2 | 9/2007 | Sneh |
| 7,383,405 | B2 | 6/2008 | Vega et al. |
| 7,594,003 | B2 | 9/2009 | Davidson et al. |
| 7,870,596 | B2 | 1/2011 | Schackow |
| 8,082,541 | B2 | 12/2011 | Pramanick et al. |
| 2001/0003828 | A1 | 6/2001 | Peterson et al. |
| 2002/0103822 | A1 | 8/2002 | Miller |
| 2002/0184624 | A1* | 12/2002 | Spencer .......................... 725/39 |
| 2004/0015504 | A1 | 1/2004 | Ahad et al. |
| 2004/0034853 | A1 | 2/2004 | Gibbons et al. |
| 2005/0105608 | A1* | 5/2005 | Coleman et al. ......... 375/240.01 |
| 2005/0188051 | A1 | 8/2005 | Sneh |
| 2005/0240558 | A1 | 10/2005 | Gil et al. |
| 2006/0005189 | A1 | 1/2006 | Vega et al. |
| 2006/0031264 | A1 | 2/2006 | Bosworth et al. |
| 2006/0089995 | A1 | 4/2006 | Kerr et al. |
| 2006/0155776 | A1* | 7/2006 | Aust ............................. 707/201 |
| 2007/0033155 | A1 | 2/2007 | Landsman |
| 2007/0033569 | A1 | 2/2007 | Davidson |
| 2007/0033588 | A1 | 2/2007 | Landsman |
| 2007/0078950 | A1 | 4/2007 | Hopkins et al. |
| 2007/0180125 | A1 | 8/2007 | Knowles et al. |
| 2007/0188594 | A1* | 8/2007 | Yoshino ...................... 348/14.1 |
| 2008/0072053 | A1 | 3/2008 | Halim |
| 2008/0098093 | A1 | 4/2008 | Simon et al. |
| 2008/0104195 | A1 | 5/2008 | Hawkins et al. |
| 2008/0147671 | A1 | 6/2008 | Simon |
| 2008/0189767 | A1 | 8/2008 | Kothari |
| 2008/0222628 | A1 | 9/2008 | Batra et al. |
| 2009/0254589 | A1* | 10/2009 | Nair et al. .................... 707/201 |
| 2009/0276771 | A1 | 11/2009 | Nickolov |
| 2010/0125477 | A1 | 5/2010 | Mousseau |

OTHER PUBLICATIONS

"How to Access the Sharing Data Offline?", pp. 1-6, http://www.computerfreetips.com/networking_tips/access_sharing_data_offline.html.

"View and Save Videos Stored in Browser Cache", pp. 1-2, http://www.thefreewindows.com/?p=334.

"Introducing Microsoft Sync Framework: Sync Services for File Systems", 2009 Microsoft Corporation, pp. 1-9, http://msdn.microsoft.com/en-us/sync/bb887623.aspx.

"IE8 Offline Storage", 2009 Microsoft Corporation, pp. 1-5, http://msdn.microsoft.com/en-us/library/cc197062(VS.85).aspx.

Kesteren, et al., "HTML5 Offline Apps", May 2008, pp. 1-4, http://www.w3.org/TR/offline-webapps/.

"HTML5 Offline Cache", Jan. 16, 2009, pp. 1-19, http://www.whatwg.org/specs/web-apps/current-work/multipage/offline.html.

U.S. Appl. No. 12/402,351, filed Mar. 11, 2009, Shukla et al.

U.S. Appl. No. 12/402,375, filed Mar. 11, 2009, Shukla et al.

"Authentication in Client Applications", 2009 Microsoft Corporation, p. 1, http://msdn.microsoft.com/en-us/library/dd199485.aspx.

Bohon, Cory, "Live Mesh now available for Mac OS X", Nov. 26, 2008, pp. 1-17, http://www.tuaw.com/2008/11/26/live-mesh-now-available-for-mac-os-x/.

Borck, James, "Product Review: Adobe Breathes Fresh AIR into RIA", Apr. 21, 2008, pp. 1-4, http://www.infoworld.com/article/08/04/21/17TC-adobe-air_1.html.

Fernandes, Dan, "Ori Amiga: Programming the Mesh", Apr. 24, 2008, pp. 1-3, http://channel9.msdn.com/posts/Dan/Ori-Amiga-Programming-the-Mesh/.

"How They Work: Three Approaches to authorization Management", www.computerworld.com/computerworld/records/images/pdf/37techtools.pdf.

"HTML5 Offline Apps", 2008, pp. 1-4, http://www.w3.org/TR/offline-webapps/.

"HTML5 Offline Cache", Jan. 24, 2009, pp. 1-19, http://www.whatwg.org/specs/web-apps/current-work/multipage/offline.html.

"IBM Lotus Expeditor 6.1 Programming Model Overview" 2006, pp. 1-12, http://publib.boulder.ibm.com/infocenter/ieduasst/lotv1r0/topic/com.ibm.iea.expeditor_v6/expeditor/6.1/ProgrammingModel/xpdv6.1_programming_model.pdf.

"IE8 Offline Storage", p. 1, http://msdn.microsoft.com/en-us/library/cc197062(VS.85).aspx.

Introducing Microsoft Sync Framework: Sync Services for File Systems, Microsoft Corporation, Nov. 2007, pp. 1-5, http://msdn.microsoft.com/en-us/sync/bb887623.aspx.

Mikhalenko, Peter, "Introducing JavaFX: Sun's New Family of Java-based Products", Feb. 26, 2008, pp. 1-7, http://www.builderau.com.au/program/java/soa/Introducing-JavaFX-Sun-s-new-family-of-Java-based-products/0,339024620,339286272,00.htm?feed=pt_air.

".NET 4.0: Enabling WCF Service for Discovery", studeni 2008—Posts—DamirDobric, pp. 1-11, http://live.mscommunity.net/blogs/damirdobric/archive/2008/11.aspx.

O'Hear, Steve, "Microsofts Mesh Wants to be your Digital-Hub" Apr. 23, 2008, pp. 1-6, http://www.last100.com/2008/04/23/microsofts-mesh-wants-to-be-your-digital-hub/.

Thorpe, Danny, "Client-Side Live Operating Environment: What's it for?", Nov. 18, 2008, pp. 1-8, http://dannythorpe.com/2008/11/18/client-side-live-operating-environment-whats-it-for/.

"Web Application Manager", Distributed Systems Solutions, Inc., 1997-2000, pp. 1-11, http://www.dssolutions.com/documents/wam_whitepaper.pdf.

Reply first Chinese Office Action cited in Chinese Application No. 201080011292.9 dated Mar. 15, 2013, 4 pgs.

Chinese Search Report cited in Chinese Application No. 201080011292.9 dated Apr. 23, 2013, 2 pgs.

Final Office Action cited in U.S. Appl. No. 12/042,375 dated Oct. 24, 2012, 50 pgs.

Reply Final Office Action cited in U.S. Appl. No. 12/042,375 dated Jan. 24, 2013, 24 pgs.

Int. Search Report cited in PCT Application No. PCT/US2010/024669 dated Sep. 29, 2010, 3 pgs.

Int. Preliminary Report on Patentability cited in PCT Application No. PCT/US2010/024669 dated Sep. 13, 2011, 5 pgs.

Office Action cited in related Chinese application No. 201080011292.9 (PCT/US2010024669) Dated: Nov. 5, 2012.

Non Final Office Action cited in related U.S. Appl. No. 12/402,351 Dated: Apr. 18, 2012, pp. 1-25.

Amendment cited in related U.S. Appl. No. 12/402,351 Dated: Jul. 18, 2012, pp. 1-26.

Notice of Allowance cited in related U.S. Appl. No. 12/402,351 Dated: Aug. 2, 2012, pp. 1-12.

Amendment cited in related U.S. Appl. No. 12/402,351 Dated: Nov. 2, 2012, pp. 1-25.

Notice of Allowance cited in related U.S. Appl. No. 12/402,351 Dated: Dec. 5, 2012, pp. 1-16.

Non Final Office Action cited in related U.S. Appl. No. 12/402,375 Dated: May 10, 2102, pp. 1-56.

Amendment cited in related U.S. Appl. No. 12/402,375 Dated: Aug. 10, 2012, pp. 1-24.

Final Office Action cited in related U.S. Appl. No. 12/402,375 Dated: Oct. 24, 2012, pp. 1-52.

Notice of Allowance cited in related Chinese application No. 201080011292.9 (PCT/US2010024669) Dated: Jul. 2, 2013 pp. 3.

Response to Second Office Action in related Chinese application No. 201080011292.9 (PCT/US2010024669) Dated: Jun. 17, 2013 pp. 4.

Second Office Action cited in related Chinese application No. 201080011292.9 (PCT/US2010024669) Dated: Apr. 2, 2013 pp. 2.

Final Office Action cited in related U.S. Application No. 12/402,375 Dated: Oct. 24, 2012 pp. 52.

Amendment/Request for Reconsideration Action cited in related U.S. Appl. No. 12/402,375 Dated: Jan. 24, 2013 pp. 29.

Non-Final Office Action cited in U.S. Appl. No. 12/402,375 dated Mar. 13, 2014, 52 pgs.

* cited by examiner

PROGRAMMING MODEL FOR SYNCHRONIZING BROWSER CACHES ACROSS DEVICES AND WEB SERVICES

BACKGROUND

A webserver often stores a set of data objects, such as HTML pages, media objects, data stores, and executable scripts, that are provided to a web browser and rendered thereby to present a set of web pages comprising a website. Web browsers typically include a browser cache where received items may be stored for reuse in subsequently rendered web pages, thereby improving the performance of the web browser, economizing the resources of the webserver, and optionally providing limited capabilities to render the web pages when the webserver cannot be accessed. In contrast with other types of data objects within a computer system (such as user documents, application and operating system binaries, and application configuration information), the data objects contained in the browser cache have typically been regarded as temporary and disposable.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Developments in web technologies have resulted in more sophisticated types of websites, which may incorporate web applications that execute within the web browser. The data objects comprising such websites and web applications are often stored in the browser cache, and it may be desirable to enable the rendering of such websites and the execution of such web applications when the webserver is inaccessible, such as when the web browser is not connected to a network or when the webserver is offline. Such data objects may also be stored in several types of browser caches (e.g., an application cache that stores application resources of a browser-hosted application and a content cache that stores data objects retrieved from websites, such as HTML documents and images.)

Contemporary users often utilize a set of computers (e.g., a portable computer, a workstation, and a cellphone device), and these computers may collectively present to the user a computing environment, such as the user's documents, installed applications, application and operating system configuration information, user profiles, representations of various individuals (e.g., contacts stored in a directory), etc. Moreover, particular aspects of these computers may be synchronized to improve the consistency of the computing environment across all such computers. However, respective computers may comprise a browser having a browser cache, the contents of which may differ as the user interacts differently with each computer. If the contents of the browser cache include an expanding set of significant data objects, such as applications available offline and saved user documents, then the divergence of such web caches among such computers may lead to computer-specific differences, such as inconsistent sets of available applications, conflicting versions of stored documents, and discrepancies in media libraries.

In order to reduce such inconsistencies and version conflicts, the browser caches of such computers may be synchronized. Among a set of computers sharing a computing environment, a computer may be configured to monitor the state of its browser cache for alterations, and to synchronize with the browser caches of the other computers according to various synchronization policies. This browser cache synchronization may also be included in the synchronization of the general computing environment among such computers, thereby improving the efficiency of the synchronization process and economizing computing resources. In addition, a programmatic interface may be provided to permit applications executing in the web browser to interact with the browser cache synchronization, such as by requesting the synchronization of various data objects and by identifying information about the synchronization policies of the browser cache. By maintaining the consistency of the browser caches of the various computers utilized by the user, these techniques may promote the consistency of the user's data objects and the computing environment.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures are shown in block diagram form in order to facilitate describing the claimed subject matter.

In the field of a computing, a webserver may provide to various visitors the content of web pages. In earlier generations of websites, such content typically involved only simple types of data objects, such as HTML documents, graphics incorporated in such HTML documents, and client-side Java- Script scripts. These data objects were delivered to a web browser that rendered the web pages comprising the website on behalf of a user.

Early in the development of web browsers, a browser cache was developed where some or all such data objects might be stored upon receipt in order for later re-use, thereby improving the performance of the web browser by avoiding redundant downloading of the data object and economizing the consumption of computing resources on the server. The data objects stored in the browser cache might also be used to render a representation of the content if the server was inaccessible, e.g., if the server was offline or if the computer was not connected to a network. While the caching of such data objects may have improved the performance of the web browser by reducing redundant network transfers, these data objects were regarded as temporary and disposable. Many browsers include an option to delete the contents of the browser cache as a temporary space-saving mechanism, since the items may often be obtained again during the user's next visit to the website.

Contemporary websites often involve more advanced types of content than in earlier generations of web development. In particular, a website may incorporate one or more applications that include executable binaries, data sources, and user-data objects, such as user-generated documents. These applications may also involve a diverse set of data objects that may be used by the web browser in presenting the application, and that may be stored in the browser cache. Moreover, the browser cache may store data objects that may be used to provide access to certain aspects of a website while the website is inaccessible (e.g., when the computer is not connected to a network, or when the website is offline.) In view of these expanded capabilities, the data objects stored in a browser cache comprise a significant portion of the user's computing environment. Contemporary browsers may also provide multiple caches of different types; e.g., data objects comprising applications resources of an application that may execute in a web browser may be stored in a browser application cache, while data objects retrieved from visited websites, such as HTML documents and images embedded therein, may be stored in a browser content cache. Both types of caches may promote the performance of the web browser in a similar manner, but the storing of resources in particular caches may provide additional advantages (e.g., a user may be able to request an emptying of the content cache while preserving the contents of the application cache.)

Another trend in modern computing environments involves a growing scope of computers that a user may utilize. For example, a user may often utilize a personal workstation, a portable computer of a notebook, palm, or pocket form factor, a cellphone, a media player, a camera, and a gaming console. While these computers may have specialized purposes and scenarios, the user may regard all of them as together comprising the computing environment. Moreover, the computing environment may comprise a large and diverse set of data objects (e.g., media objects, documents, applications, and operating system preferences), and these data objects may be shared across all such computers. For example, these data objects may be automatically synchronized to provide a more consistent user experience, so that a change to the computing environment on one computer (e.g., the addition of new media objects or applications, or alterations to a document) may be automatically propagated throughout the computing environment.

Figure 1:
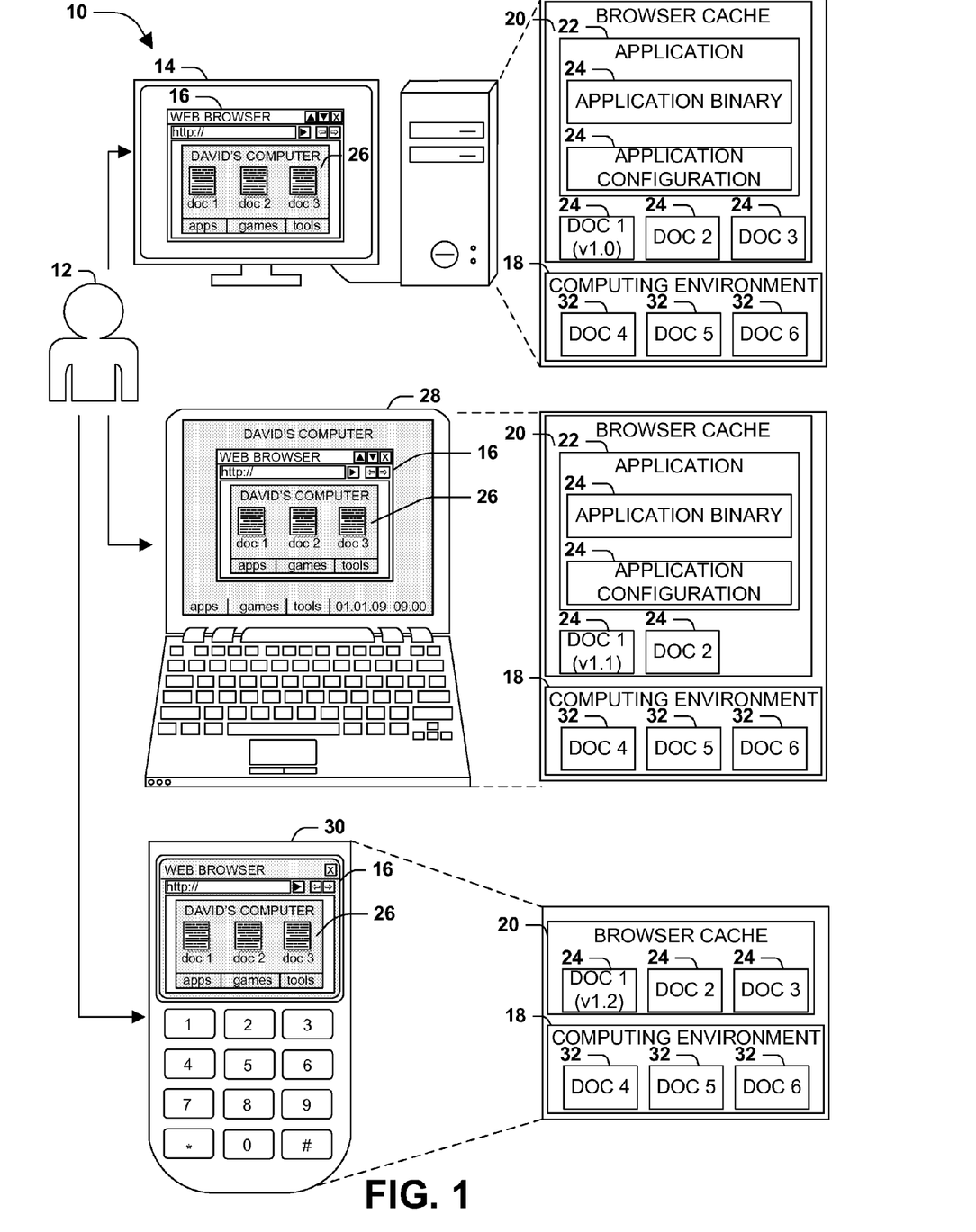
FIG. 1 is a component block diagram illustrating an exemplary scenario involving a set of computers featuring browsers having browser caches.

FIG. 1 illustrates an exemplary scenario 10 where user 12 may operate a set of computers, including a workstation 14, a notebook computer 28, and a cellphone device 30, that share a computing environment 18 storing a set of data objects, e.g., a set of documents 32. Each computer is also equipped with a browser 16 that may be used to render an application 22 comprising a set of data objects 24 that may be delivered to the respective computers and stored in a browser cache 20 associated with the browser 16. The data objects 24 may include, e.g., an application binary comprising the logic and user interface of the application 22, an application configuration that stores various settings and preferences selected by the user 12, and various documents created with the application 22, which may be presented to the user 12 in the browser 16 as a user document 26. Additional data objects may be stored in the computing environment 18 but outside of the browser cache 20, such as a set of documents 32. Moreover, the computing environments 18 of these computers may share some or all of data objects; e.g., the documents 32 stored as data objects in the computing environment 18 may be shared among the computers for accessibility on all of the computers across which the computing environment 18 is shared.

However, problems may arise if each of these various computers comprises a browser having a browser cache, and if such browser caches incorporate data objects that comprise a significant portion of the user's computing environment. Because the browser caches in earlier generations of browsers only stored temporary and disposable data objects, even if the data objects in the computing environment are synchronized, the browser caches of the computers may not be included in this synchronization. Accordingly, the browser caches of various computers that comprise the user's computing environment may diverge, leading to different computing environments on different computers (e.g., different versions of a document stored in the browser cache, or different sets of browser-stored applications that may be available on different computers.) As further illustrated in the exemplary scenario 10 of FIG. 1, even if the documents 32 and other data objects in the computing environment 18 are automatically synchronized among the computers, the contents of the respective browser caches 20 may fall out of synchronization. As a first example, the data object 24 comprising a first document ("DOC 1") might exist in different versions in each computer, which might occur if the document were updated at different times on the different devices but not synchronized. As a second example, data objects 24 may be present in one browser cache 20 but not in another browser cache 20; e.g., the data object 24 named "DOC 3" is included in the browser cache 20 of the workstation 14, but not in the browser cache 20 of the notebook computer 28. As a third example, an application 22 may be stored for offline access in some computers, but not in other computers; e.g., in this exemplary scenario 10, the "Application" application 20 is stored for offline access on the workstation 14 and the notebook computer 28, but not on the cellphone device 30. While some of these discrepancies might arise at the selection of the user 12 (e.g., an instruction from the user 12 to exclude the application 22 from the cellphone device 30) or based on logical rationale (e.g., an inability to execute the application 22 with the cellphone device 30 due to storage space, performance, or hardware limitations), in other cases these discrepancies might be undesirable and avoidable, but may nevertheless arise due to the absence of a mechanism to synchronize the browser caches 20 of the computers comprising the computing environment of the user 12.

Figure 2:
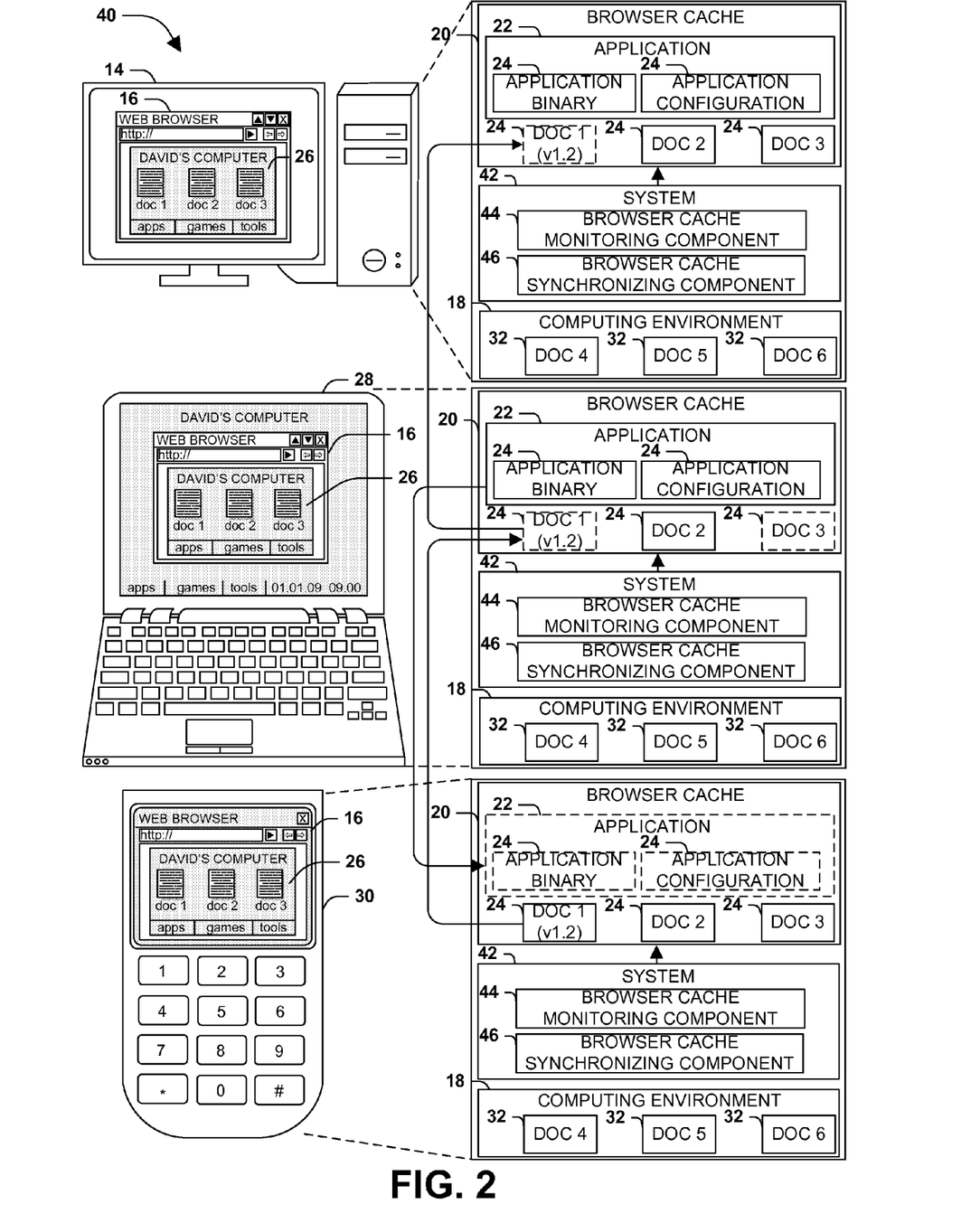
FIG. 2 is a component block diagram illustrating an exemplary scenario involving a set of computers featuring browsers having synchronizable browser caches.

FIG. 2 illustrates an exemplary scenario 40 featuring an embodiment of this technique. In the exemplary scenario 40 of FIG. 2, the workstation 14, notebook computer 28, and cellphone device 30 may again respectively comprise a browser 16 coupled with a browser cache 20 configured to store data objects 24, such as may belong to an application 22. These computers may also collectively comprise a computing environment 18 that is shared across all such computers containing a set of data objects (such as documents 32) to be synchronized among such computers in order to present a more consistent computing environment to the user. However, in this exemplary scenario 40, one or more of the computers may also comprise an exemplary system 42 configured to synchronize the browser cache 20 of a browser 16 of the respective computer with a remote store of a remote computer, such as a browser cache 20 of a browser 16 of another computer. The exemplary system 42 may comprise a browser cache monitoring component 44, which may monitor the browser cache 20 that is configured to detect a writing of a data object 24 to the browser cache 20, such as the creation, editing, or deletion of a cached data object 24. The exemplary system 42 may also comprise a browser cache synchronizing component 46, which may be configured, upon the browser cache monitoring component 44 detecting the writing, to synchronize the browser cache 20 with the remote store (e.g., the browser cache 20 of another computer.) As a first example, the browser cache monitoring component 44 implemented in the cellphone device 30 may detect the writing a recent version of the "DOC 1" data object 24 to the browser cache 20, and may deliver the data object 24 to the browser cache 20 of the notebook computer 28 (e.g., by either directly interacting with the browser cache 20, by providing the data object 24 to the browser cache synchronizing component 46 of the notebook computer 28 for writing to its browser cache 20, etc.) The browser cache monitoring component 44 of the notebook computer 28 may in turn detect the writing of the "DOC 1" data object 24 (replacing the earlier 1.1 version of the data object 24), and the browser cache synchronizing component 46 may deliver the updated data object 24 to the browser cache 20 of the workstation 14.

As a second example illustrated in FIG. 2, the browser cache monitoring component 44 may detect the writing of the "DOC 3" data object 24 and its absence from the browser cache 20 of the notebook computer 28, and upon this detection, the browser cache synchronization component 46 of the workstation 14 may deliver the "DOC 3" data object 24 to the browser cache 20 of the notebook computer 28. As a third example, the browser cache monitoring component 20 of the notebook computer 28 may detect the storing of the data objects 24 comprising the application resources of the application 22, and the browser cache synchronizing component 46 of the notebook computer 28 may, upon detecting the absence of such data objects 24 from the browser cache 20 of the cellphone device 30, send these data objects 24 to the cellphone device 30. In this manner, the browser caches 20 of the various computers may be brought into synchrony, thereby presenting the user with a consistent computing environment (including the current version of the "DOC 1" data object 24, the presence of the "DOC 3" data object 24, and the availability of the application 22 on all computers.)

Figure 3:
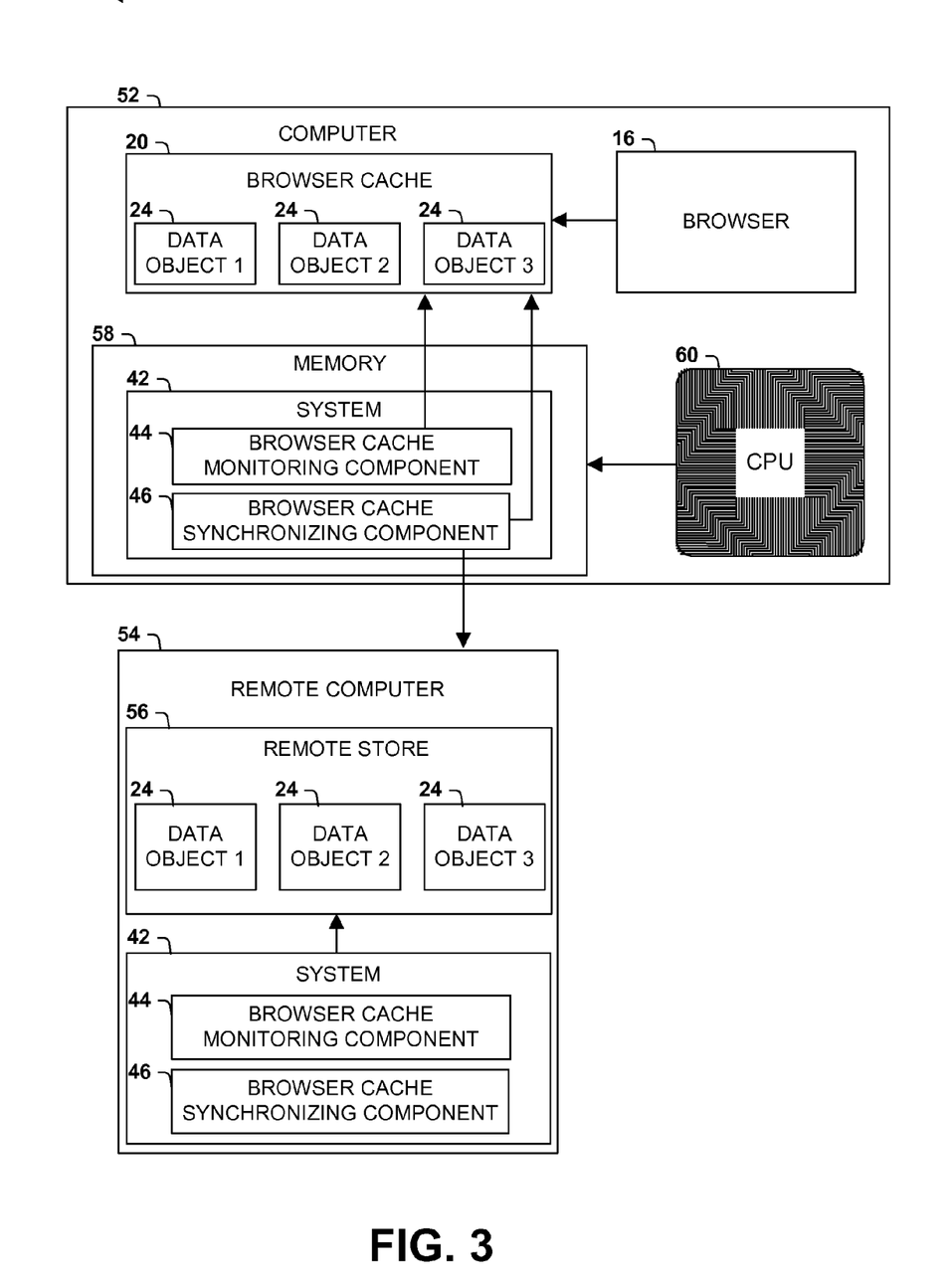
FIG. 3 is a component block diagram illustrating an exemplary system configured to synchronize a browser cache of a browser on a computer with a remote store of a remote computer
Figure 4:
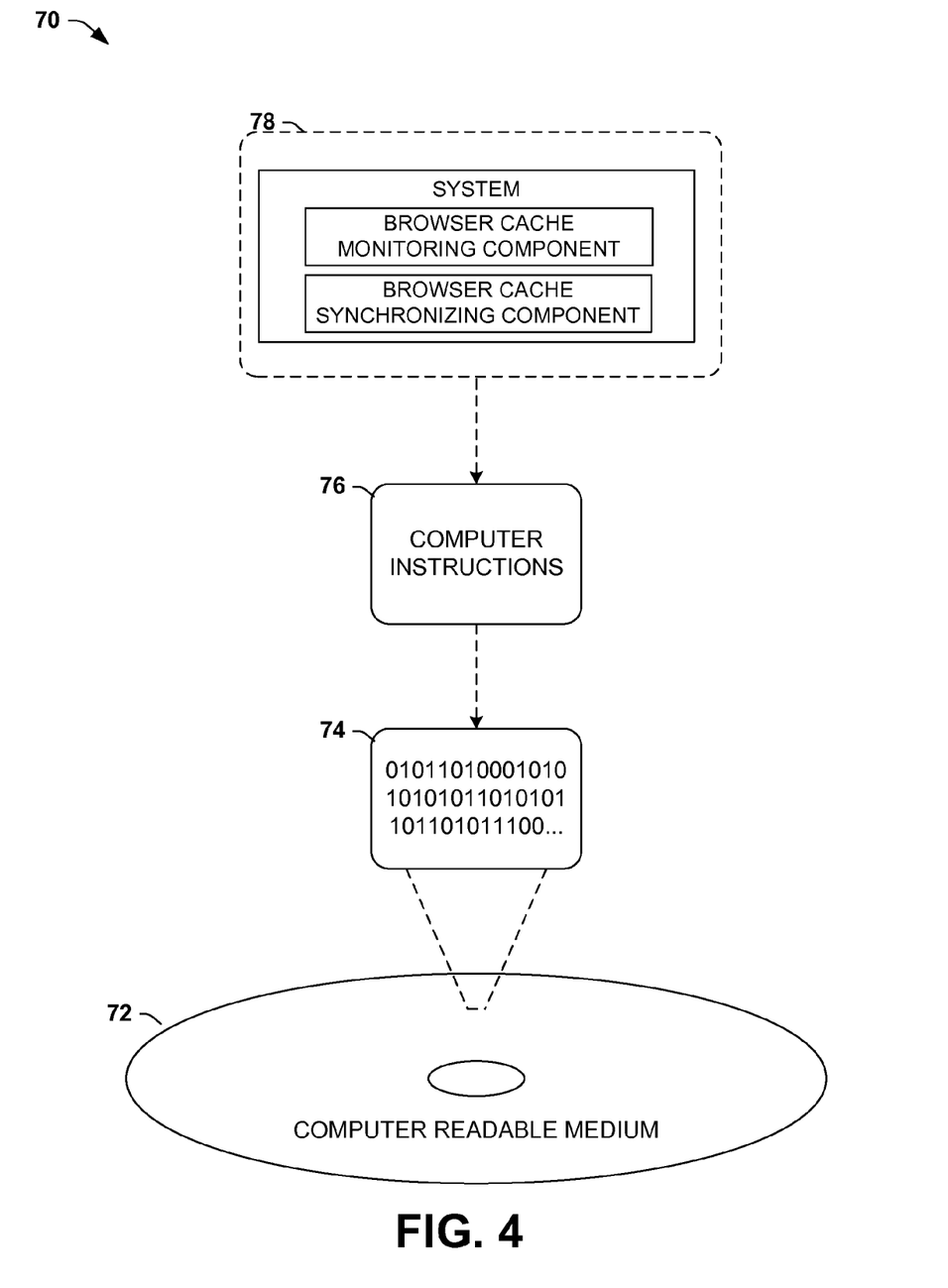
FIG. 4 is an illustration of an exemplary computer-readable medium comprising processor-executable instructions configured to embody one or more of the provisions set forth herein.

More generally, and in view of these scenarios, FIG. 3 presents an exemplary embodiment 42 of the techniques discussed herein as an exemplary system 42 configured to synchronize a browser cache 20 of a browser 16 on a computer 52 with a remote store 56 of a remote computer 54. The exemplary system 42 may comprise a browser cache monitoring component 44, which may be configured to detect a writing of at least one data object 24 in the browser cache 20, and a browser cache synchronizing component 46, which may be configured, upon the browser cache monitoring component 44 detecting the writing, to synchronize the browser cache 20 with the remote store 56. The exemplary system 58 may comprise, e.g., a set of instructions stored in a memory 58 of the computer 52 and executable on a processor 60 in order to support the browser cache 20 and the synchronization of the computing environment of the computer 52 with other computers (such as the remote computer 54) utilized by a particular set of users.

Figure 5:
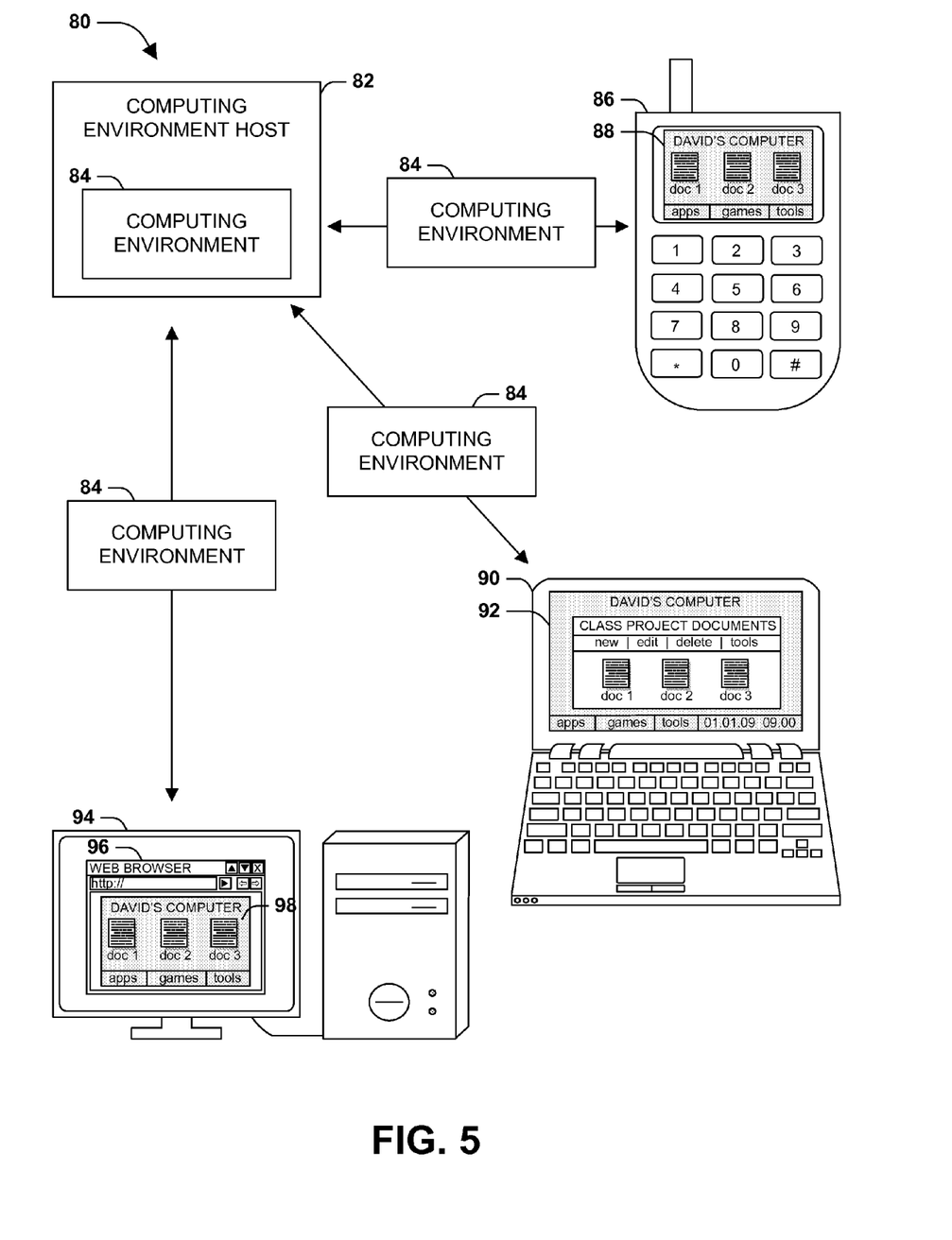
FIG. 5 is an illustration of an exemplary interaction of a computing environment host with various computing environment rendering devices.

Another embodiment of these techniques involves a computer-readable medium comprising processor-executable instructions configured to apply the techniques presented herein. An exemplary computer-readable medium that may be devised in these ways is illustrated in FIG. 5, wherein the implementation 70 comprises a computer-readable medium 72 (e.g., a CD-R, DVD-R, or a platter of a hard disk drive), on which is encoded computer-readable data 74. This computer-readable data 74 in turn comprises a set of computer instructions 76 configured to operate according to the principles set forth herein. In one such embodiment, the processor-executable instructions 76 may be configured to implement a system configured to synchronize a browser cache of a browser on a computer with a remote store of a remote computer, such as the exemplary system 42 of FIG. 3. Many such computer-readable media may be devised by those of ordinary skill in the art that are configured to operate in accordance with the techniques presented herein.

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary system 42 of FIG. 3) to confer individual and/or synergistic advantages upon such embodiments.

A first aspect that may vary among embodiments of these techniques relates to the type of synchronization that may be performed between the browser cache 20 and the remote store 56. The process of synchronizing data objects may have many variables that may be differently adjusted to suit different scenarios. As a first example, the synchronization may be triggered by many events. In one such embodiment, the synchronization may be triggered promptly after the browser cache monitoring component 44 detects a writing of a data object 24 to the browser cache 20. While prompt synchronization may provide a high degree of synchrony between the browser cache 20 and the remote store 56, this triggering may be inefficient, e.g., by establishing a connection between the computer 52 and the remote computer 54 upon each writing, and/or by establishing a series of connections and data transfers in a short timeframe for a data object 24 that is updated several times in a short time frame. In another such embodiment, the synchronization may be triggered upon the browser monitoring component 44 detecting the writing, but after a particular threshold has been met, e.g., after a defined threshold period has elapsed without further writing to the browser cache 20, and/or after a defined threshold amount of data has been written to the browser cache 20. Alternatively or additionally, a synchronizing may be triggered by the remote computer 54; e.g., the remote computer 54 may sent a notification to the computer 52 to synchronize the browser cache 20 with the remote store 56, and the browser cache synchronizing component 46 may be configured, upon receiving the notification from the remote computer 54 to perform this synchronization. This type of configuration may be advantageous between computers having a peer relationship, e.g., two computers wherein the browser cache 20 of either computer 52 may be altered. As another alternative, the synchronizing may be triggered periodically, such as at a predetermined time on a weekly basis or after a certain amount of time has elapsed since the last synchronization. As yet another alternative, the synchronizing may be triggered based on other factors, such as when the processor 60 is detected to have been idle for a threshold period of time, or when an availability of network bandwidth is detected.

As a second variation of this first aspect, the synchronization may occur in many ways. As a first example, the computer 20 may simply deliver to the remote computer 54 any data objects 24 that change on the computer 20, without examining the contents of the remote store 56. This configuration may be suitable, e.g., where the remote computer 54 comprises an archival server that only receives updates from the computer 52. As a second example, the browser cache synchronizing component 46 may enquire as to the contents of the remote store 56 of the remote computer 54, and may compare respective data objects 24 to determine the data objects 24 that are missing or outdated in the remote store 56 and due for updating. Alternatively, the browser cache synchronizing component 46 may deliver a list of the contents of the browser cache 20 to the remote computer 54 for comparison with the contents of the remote store 56, and may receive from the remote computer 54 a list of operations to be performed in order to synchronize the browser cache 20 and the remote store 56. In either embodiment, this comparing may take into account many factors, e.g., the modification dates of the data objects 24, the sizes or types of the data objects 24, a version identifier attributed to various data objects 24, and/or a hashcode representing the contents of the data objects 24. The browser cache synchronizing component 46 may then send to the remote computer 54 the data objects 24 that are to be delivered in order to synchronize the browser cache 20 and the remote store 56. Alternatively or additionally, the browser cache synchronizing component 46 may also request data objects 24 that are newly stored or more recently updated on the remote computer 54, and may store such data objects 24 upon receipt in the browser cache 20. Alternatively or additionally, if a data object 24 is found to have changed in both the browser cache 24 and the remote store 56, the browser cache synchronizing component 46 and/or the remote computer 54 may determine whether to select one of the representations of the data object 24 as authoritative and may replace the non-authoritative representations. Alternatively, it may be possible to merge the representations of the data object 24 to produce a hybrid data object 24 containing all such changes, and to replace both instances with the hybrid data object 24.

One feature of this second variation that illustrates some of the variable complexity of synchronization relates to the discovery of data objects in the remote store 56 that are not present in the browser cache 20. Such data objects 24 might exist if either newly stored in the remote store 56 since the last synchronization, or if such data objects 24 were removed from the browser cache 20. In one such embodiment, if the browser cache synchronizing component 46 detects a data object 24 in the remote store 56 that is not present in the browser cache 20, it may request the remote computer 54 to remove the data object 24 from the remote store 56 (thereby presuming a removal from the browser cache 20.) Conversely, the browser cache synchronizing component 46 may be configured to receive requests from the remote store 56 to remove data objects 24 from the browser cache 20 that have been removed from the remote store 56, and may act accordingly to maintain synchrony. Alternatively or additionally, the browser cache monitoring component 44 may endeavor to detect a removing of at least one removed data object 24 in the browser cache 20, and the browser cache synchronizing component 46 may then request the remote computer 54 to remove the data object 24 from the remote store 56 (thereby presuming a new addition to the remote store 56.) In yet another embodiment, the browser cache monitoring component configured to detect a removing of at least one removed data object 24 from the browser cache 20, and may request the removal of such removed data objects 24 from the remote store 56. Any data objects 24 thereafter identified in the remote store 56 may be presumed to have been recently added to the remote store 56. In yet another embodiment, the browser cache 20 and/or the remote store 56 may maintain a journal of modifications to the respective data object stores, and may examine or compare such journals to determine an accurate synchronization operation.

As a third variation of this first aspect, these techniques may be selectively applied to particular data caches offered by the web browser. Because data objects received by a web browser may be useful in different contexts (e.g., application resources belonging to an application and content-type data objects that are used in the rendering of a web page, such as HTML documents, style sheets, and embedded media objects), the web browser may store such data objects in different caches (e.g., an application cache configured to store application resources and a content cache configured to store content-type data objects.) The synchronization techniques related herein may be applied to the contents of such caches in various ways. As a first example, the synchronization may be applied uniformly to all data objects in all such caches. As a second example, the synchronization may be applied only to particular caches configured to store data objects of more significant value (e.g., an application cache), and to disregard the contents of data caches configured to store less useful data objects. As a third example, the synchronization may be applied differentially to such caches; e.g., an application cache may be synchronized in full and on a frequent basis, while a content cache may be synchronized only with regard to a portion of the data objects stored therein (e.g., data objects retrieved or accessed within a recent time frame), and may be synchronized on a less rigorous schedule.

Additional variations of this first aspect may relate to more sophisticated forms of synchronization. As a first example, the browser cache synchronizing component 46 and/or the remote store 56 may be configured to synchronize only a portion of the data objects 24, such as a subset of data objects 24 matching at least one synchronized data object criterion. For example, the browser cache synchronizing component 46 may be configured to synchronize only data objects 24 comprising user data files, and/or only data objects 24 comprising application binaries, and/or only data objects 24 belonging to a particular user or application, and/or only data objects 24 not exceeding a particular data size. The browser cache synchronizing component 46 may therefore disregard other data objects 24 stored in the browser cache 20 during the synchronization. As a second example, a synchronization policy may be devised that describes various aspects of the synchronization, such as the synchronization triggering policy (e.g., the set of circumstances under which a synchronization may begin), a synchronization type policy (e.g., a unidirectional synchronization vs. a bidirectional synchronization), a data object comparing policy (e.g., the criteria by which two representations of a data object are compared to detect differences), a data object type merging policy (e.g., the types of data objects 24 that may be merged and the logic for doing so), and/or a data object conflict resolution policy (e.g., the logic by which differing representations of a data object 24 are resolved.) It may be advantageous to define several synchronization policies describing a variety of forms of synchronization (e.g., a first synchronization policy applied during an infrequent synchronization and a second synchronization policy applied during a frequent, incremental synchronization.) Moreover, the synchronization policies may be defined either by the computer 52 or by the remote computer 54, depending on the relationship therebetween. Those of ordinary skill in the art may devise many techniques for initiating and performing the synchronization of the browser cache 20 and the remote computer 54 while implementing the techniques discussed herein.

A second aspect that may vary among embodiments of these techniques relates to the architecture of the implementation. As a first example, the browser cache monitoring component 44 and the browser cache synchronizing component 46 may execute in various manners within the computer 52. In a first such embodiment, the browser cache monitoring component 44 may be configured to execute on the computer 52 within the browser 16, e.g., as part of the browser 16 or a plug-in installed therein. This implementation may be helpful if the browser cache monitoring component 44 is primarily tasked with monitoring the browser cache 20 for changes in order to trigger a synchronizing by the browser cache monitoring component 46, because such changes may likely arise only when the browser 16 is executing. By contrast, and alternatively or additionally, the browser cache synchronizing component 46 may be configured to execute on the computer 52 as a process outside of the browser 16, e.g., as a background service of the computer 52. This may be advantageous because the synchronizing may occur independently of the browser 16, e.g., by synchronizing changed data objects 24 without interfering with the rendering of web pages and the executing of applications 20 by the browser 16, and by permitting the synchronizing of the browser cache 20 with the remote store 56 to occur when such applications 20 are not executing, and even if the browser 16 is not executing. For example, when the computer 52 is connected to a network but when the user 12 is not using the browser 16 (e.g., when the computer 52 is idle), the browser cache synchronizing component 46 may retrieve some updated data objects 24 from the remote store 56 and store them in the browser cache 20, and such objects may be used in the browser 16 when the user 12 requests to use these data objects 24 (e.g., invokes an application 22 incorporating such web objects 24), even if the computer 52 is in an offline state.

As a second example of this second aspect, the architecture of the embodiments of these techniques may account for the actions of other processes within the computer 54 while implementing the features described herein. For example, it may be advantageous to implement the browser cache synchronizing component 46 as a process executing outside of the browser 16, but this independence may permit a competitive interference of these two processes. As a first example, the browser cache synchronizing component 46 may attempt to replace a data object 24 that is in use by the browser 16, causing a data violation error. As a second example, the browser cache synchronizing component 46 and the browser 16 may each update a data object 24, and if an object synchronization construct is not used, a race condition may arise, resulting in a loss of data and potential logical problems. In order to avoid such problems and improve the implementation of these techniques, the browser cache monitoring component 44 and/or the browser cache synchronizing component 46 may respect the actions of other processes. As a first example, the browser cache synchronizing component 46 may request an access lock (such as a semaphore or a mutex) on a data object 24 before synchronizing the data object 24 with the remote store 56, and may release the lock on the data object 24 upon completing the synchronizing of the data object 24. Alternatively or additionally, the browser cache monitoring component 44 may be configured, upon detecting an updating of a data object 24 by the browser cache synchronizing component 46 that is in use by the browser 16, to notify the browser 16 of the availability of the updated data object 24, and the browser may reload the updated data object 24 at a convenient moment in the operation of the browser 16 (e.g., when the data object 24 is not actively in use.)

As a third example of this second aspect, the synchronizing performed by the browser cache synchronizing component 46 may be included in a broader synchronizing of the computing environment 18 with the remote store 56. In a first such implementation, two computers may share data objects 24 stored both within the browser cache 20 and stored outside of the browser cache 20 but within the computing environment 18 (e.g., files stored in the filesystem of the computer 52, user profiles stored by the operating system, and records stored in a database.) A synchronization process may be devised to synchronize a large and diverse set of data objects 24 stored and accessed in many data object systems, including data objects 24 stored in the browser cache 20, during a single synchronization. This may be helpful, e.g., for permitting a user 12 to specify a single synchronization policy to be applied to all data objects 24 regardless of how such data objects 24 are stored, and for permitting one component to perform the synchronizing of such data objects 24 instead of implementing multiple synchronization components that independently (and perhaps conflictingly) synchronize different sets of data objects 24.

In one such embodiment, the computing environment 18 may represent a deployable computing environment, and the remote computer 54 may comprise a computing environment host. In order to reduce the complex variety and decentralization of the objects comprising a contemporary computing environment, a deployable representation of the computing environment may be devised, where the objects comprising the computing environment are organized in a data object hierarchy, which may be hosted by a computing environment host. This computing environment host may be configured to store a representation of the entire set of computers that comprise the computing environment 18 of the user 12; to coordinate the synchronization of the computing environment 18 among such computers; to store an authoritative representation of the computing environment 18 (e.g., the particular representations of data objects 24 that carry priority in resolving version conflicts); and/or to manage the deployment of the computing environment 18 or a portion thereof to particular computers 52, such as newly added computers. (It may be appreciated that the remote store 56 in this scenario may not necessarily correspond to a browser cache on the computing environment host 82, which may comprise a file server that does not even contain a browser, but may instead, e.g., represent a portion of the filesystem of the computing environment host 82 allocated to store the deployable computing environment 84.) The data object hierarchy may be delivered to various devices to represent the same computing environment (including the same user profiles, applications, data files, etc.), and each device may render the computing environment in a consistent manner but customized based on the capabilities of the device (e.g., a hard keyboard interface for receiving data entry from a keyboard device attached to a workstation, and a touchscreen software keyboard interface for receiving data entry from a cellphone device.) A user of the deployable computing environment may therefore interact with the deployable computing environment in a platform- and device-independent manner, while also achieving at least some of the advantages over alternative accessing techniques, such as synchronous or asynchronous invoking, batching of standard operations, and mobile agents. Moreover, if the data objects 24 comprising the computing environment 18 are represented in a uniform manner and managed in a consistent way within the deployable computing environment (regardless of the particular data object system through which such data objects 24 are accessed), a set of services may be devised to apply to all of the data objects of the computing environment. However, those of ordinary skill in the art may devise many such scenarios in which the techniques discussed herein may be applied.

FIG. 5 illustrates one such scenario 80, wherein the computing environment may be hosted by a computing environment host 82, which may store and manage a deployable computing environment 84. The computing environment host 82 may also render the deployable computing environment 84 in different ways on behalf of various devices, such as a cellphone device 86, a personal notebook computer 90, and a public workstation 94, and also on behalf of different types of users having different access privileges. The rendering of the computing environment therefore reflects a consistent computing environment across all devices that expose the same applications, user profiles, shell configuration, user data objects, etc. Thus, a user may access a full-featured version 92 of the computing environment through a high-performance notebook computer, a stripped-down version 88 of the computing environment on a low-power cellphone device 86, and a browser-compatible and privacy-oriented version 98 of the computing environment through a web browser 86 of a public terminal 94. To the extent that the capabilities of each such device support the rendering of the computing environment, a consistent user interface and data set may be presented due to the rendering of the deployable computing environment 84 adjusted to the capabilities of each device. Updates to the computing environment may be propagated back to the computing environment host 82, and may be automatically synchronized with other devices. The various devices may also cooperate by sharing locally stored data with other devices, and by controlling or being controlled by other devices. Hence, the computing environment may therefore be devised and presented as a cloud computing architecture, comprising a device-independent representation (a "cloud") expressed as a consistent rendering across all devices ("clients") that form a mesh of cooperating portals (with device-specific properties) to the same computing environment. Specifically with respect to the applications of the computing environment, the deployable computing environment 84 may include a representation of the application set, the application resources, and the data objects created thereby. Moreover, the computing environment host 82 may apply services to the various objects comprising the data object hierarchy 32, and the common format in which the data objects are stored in the deployable computing environment 84 may facilitate consistent availability and application of the services regardless of the nature of the data objects applied thereto.

With reference to this second aspect, if the computer 52 features a computing environment 18 representing a deployable computing environment 84 managed by a computing environment host 82, the techniques discussed herein may be implemented with particular advantages related thereto. As a first example, if the computing environment host 82 serves as the remote computer 54, it may be advantageous to represent the browser cache 20 as part of the computing environment 18. Moreover, if the remote store 56 comprises the representation of the deployable computing environment 84 managed by the computing environment host 82, then the synchronization of the entire computing environment 18, including the browser cache 20, may be performed together. For example, a computing environment component may be devised that manages the synchronization of a large set of data objects 24 of the computer 52 with the computing environment host 82, including data objects 24 stored within the browser cache 20 as well as data objects 24 stored in and accessible through other data object systems, such as files in the filesystem, configuration information stored in the system registry, and user profiles stored by the operating system. The synchronization may then be performed uniformly on the contents of the browser cache 20 as well as the rest of the computing environment 18, and other services (e.g., an authenticating service and a compression service) may be devised and uniformly applied to all such data objects 24. Again, it may be desirable to perform the synchronization of all such objects 24 as a single synchronization process, and/or in a single component, such as a computing environment component that synchronizes all data objects 24 of the deployable computing environment 84 with the computing environment host 82. Moreover, the computing environment host 82 may also handle the delivery of such data objects to other computers that share the computing environment, such that each computer 54 may primarily communicate with the computing environment host 82 but may nevertheless receive data objects 24 originally created or recently updated on other computers 54.

As a fourth example of this second aspect, the browser cache monitoring component 44 and/or the browse cache synchronizing component 46 may feature a synchronization programmatic interface, which may permit applications 22 executing within the browser 16 to interact with the synchronizing of the data objects 24 in the browser cache 20. As a first example, the synchronization programmatic interface may permit applications 22 to identify details of the synchronization, such as the date of the last synchronization of a data object 24 and the source of the data object 24. In one such embodiment, the synchronization programmatic interface may comprise at least one synchronization policy disclosing operation configured to disclose at least one property of at least one synchronization policy of the synchronization, and at least one synchronization policy setting operating configured to set at least one property of at least one synchronization policy. For example, an application may be supplied by an application host that updates a particular application resource on a fixed schedule, such as an antivirus software vendor that supplies a new antivirus definition database at midnight each Sunday. The application host may therefore configure the application 22 to instruct the browser cache synchronizing component 46, via the synchronization programmatic interface, to update the data object 24 comprising this application resource at the predetermined time. The application 22 may also use the synchronization programmatic interface to identify the date and time of the last such synchronization of the data object 24 (e.g., in order to notify a user 12 if the virus definition database is out of date), and/or to restrict the synchronization of the data object 24 only with trusted sources identified by the application host (e.g., so that an virus definition database may only be retrieved directly from the antivirus software vendor.) Alternatively or additionally, the browser cache synchronizing component 46 may expose a synchronization programmatic interface configured to invoke the browser cache synchronizing component 46 to synchronize the browser cache 20 (or a portion thereof) with the remote store 54. For example, an application 22 may be permitted to invoke a synchronizing of a particular data object 24 by the browser cache synchronizing component 46 through an operation of the synchronization programmatic interface (e.g., if a user of an antivirus application requests a prompt updating of a virus definition database.)

Additionally, the synchronization programmatic interface may be implemented in a familiar and well-established manner, which may permit applications to utilize the interfaces conveniently and without significant redesign. For example, a web browser plug-in designed to support applications 22 executing in a web browser 16 may expose a JavaScript-based synchronization programmatic interface, e.g., as a set of operations that may be invoked in JavaScript to read and write various data objects 24 in the browser cache 20. Alternatively or additionally, synchronization the programmatic interface may support higher-level languages, e.g., object-oriented languages such as Java and C#; may expose more sophisticated details of the computing environment, such as the scheduling of the synchronization service, the freshness and policies of the local cache, and the relationships of the computers comprising the computing environment (e.g., which computer serves as the host of an authoritative representation of a particular data object); and/or may include more sophisticated programming constructs that permit more powerful programmatic access (e.g., event subscriptions and data feeds that may notify applications of computing environment events, such as the synchronization of a particular data object.) In this manner, the programmatic interface may expose a wide variety of aspects of the computing environment in a sophisticated manner, while also adhering to familiar programming models that may be readily adopted by developers without having to redesign or rewrite large portions thereof utilizing different programming techniques. Those of ordinary skill in the art may devise many architectures and features thereof while implementing the techniques discussed herein.

A third aspect that may vary among embodiments of these techniques relates to data-object-specific features that may be included in various implementations thereof. As a first example, a data object 24 that an application 22 requests to be stored in the browser cache 20 may have one or more unusual properties, such as a large data object or a numerous set of associated data objects. Some browser caches 20 may be unable to accommodate such caching. For example, a browser cache 20 may impose a size limit on particular data objects, and a particular data object 24 may be too large to store in the browser cache 20 (e.g., a large database that may be provided for offline access by the application 22.) Instead, the browser 16 may be configured to store such data objects 24 outside of the browser cache 20 and in the computing environment 18, such as a file in a filesystem, and to store in the browser cache 20 a reference to the data object 24 stored outside of the browser cache 20. Moreover, the browser cache monitoring component 44 may be configured to monitor the updating of the data object 24 stored outside of the browser cache 20 along with the updating of data objects 24 stored within the browser cache 20; and/or the browser cache synchronizing component 46 may be configured to synchronize such data objects 24 stored outside the browser cache 20 along with the data objects 24 stored within the browser cache 20.

As a second example of this third aspect, a data object 24 stored in the browser cache 20 may comprise an application resource of an application 22 configured to execute within the browser 16. The browser cache monitoring component 44 and/or the browser cache synchronizing component 46 may be configured to handle such data objects 24 in a particular manner. In a first such scenario, the data object 24 may comprise an application installer package, which may be invoked to install the application 22 within the browser 16. The browser cache synchronizing component 46 may therefore be configured, upon receiving the data object 24 from the remote computer 54, to invoke the application installer package to install the application 22. As a second example, the application 22 with which the data object 24 is associated may be associated with an application host, and may be configured to execute in an application host connection context, such as a connected context or a disconnected context. In one such scenario, the data object 24 may comprise an offline application resource, and the application 22 may be configured to use the offline application resource when the application 22 executes in a disconnected context. Those of ordinary skill in the art may devise many techniques for configuring the browser cache monitoring component 44 and/or the browser cache synchronizing component 46 with respect to particular types of data objects 24 while implementing the techniques discussed herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 6:
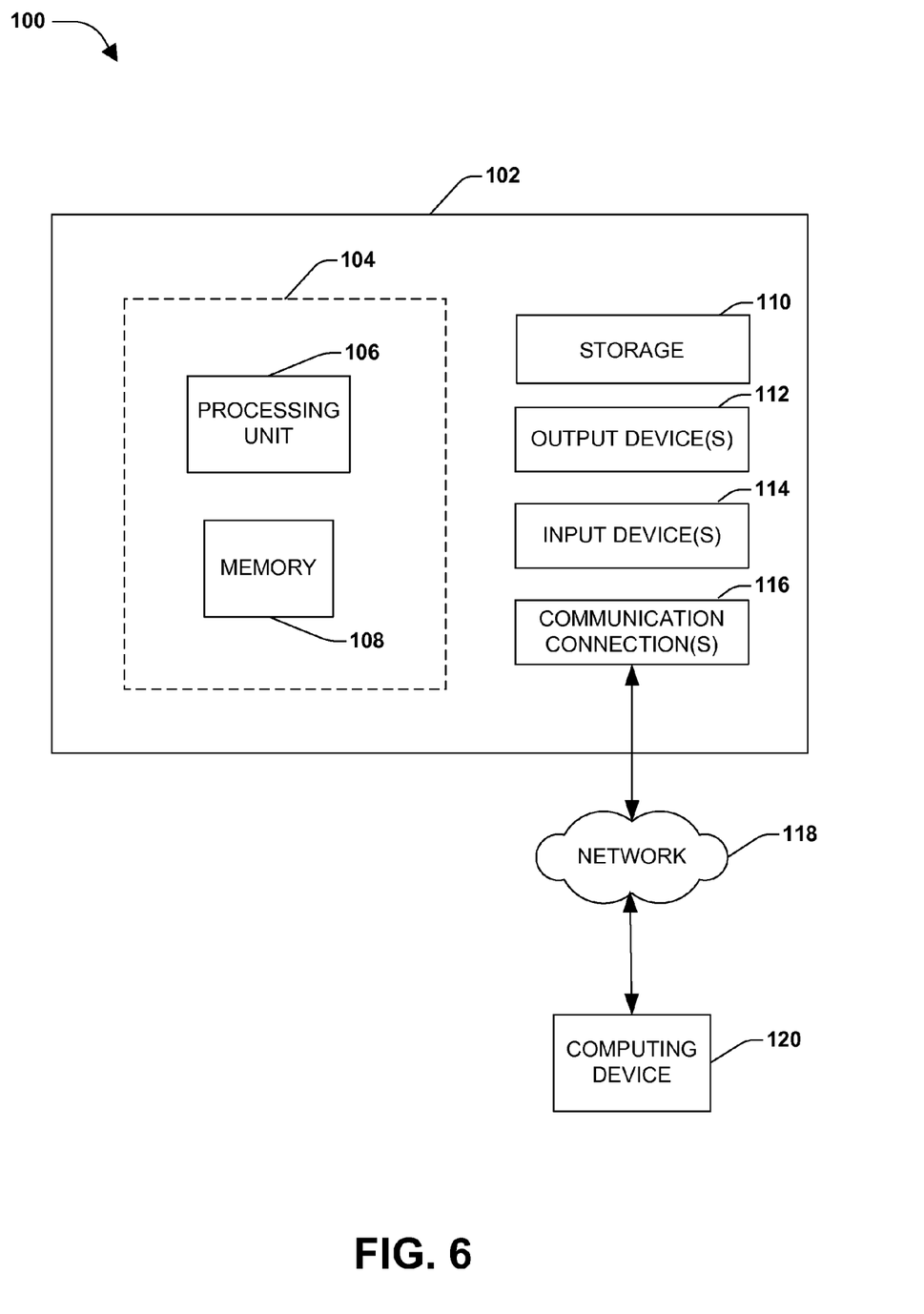
FIG. 6 illustrates an exemplary computing environment wherein one or more of the provisions set forth herein may be implemented.

FIG. 6 and the following discussion provide a brief, general description of a suitable computing environment to implement embodiments of one or more of the provisions set forth herein. The operating environment of FIG. 6 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 6 illustrates an example of a system 100 comprising a computing device 102 configured to implement one or more embodiments provided herein. In one configuration, computing device 102 includes at least one processing unit 106 and memory 108. Depending on the exact configuration and type of computing device, memory 108 may be volatile (such as RAM, for example), non-volatile (such as ROM, flash memory, etc., for example) or some combination of the two. This configuration is illustrated in FIG. 6 by dashed line 104.

In other embodiments, device 102 may include additional features and/or functionality. For example, device 102 may also include additional storage (e.g., removable and/or non-removable) including, but not limited to, magnetic storage, optical storage, and the like. Such additional storage is illustrated in FIG. 6 by storage 110. In one embodiment, computer readable instructions to implement one or more embodiments provided herein may be in storage 110. Storage 110 may also store other computer readable instructions to implement an operating system, an application program, and the like. Computer readable instructions may be loaded in memory 108 for execution by processing unit 106, for example.

The term "computer readable media" as used herein includes computer storage media. Computer storage media includes volatile and nonvolatile, removable and non-removable media implemented in any method or technology for storage of information such as computer readable instructions or other data. Memory 108 and storage 110 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 102. Any such computer storage media may be part of device 102.

Device 102 may also include communication connection(s) 116 that allows device 102 to communicate with other devices. Communication connection(s) 116 may include, but is not limited to, a modem, a Network Interface Card (NIC), an integrated network interface, a radio frequency transmitter/receiver, an infrared port, a USB connection, or other interfaces for connecting computing device 102 to other computing devices. Communication connection(s) 116 may include a wired connection or a wireless connection. Communication connection(s) 116 may transmit and/or receive communication media.

Device 102 may include input device(s) 114 such as keyboard, mouse, pen, voice input device, touch input device, infrared cameras, video input devices, and/or any other input device. Output device(s) 112 such as one or more displays, speakers, printers, and/or any other output device may also be included in device 102. Input device(s) 114 and output device(s) 112 may be connected to device 102 via a wired connection, wireless connection, or any combination thereof. In one embodiment, an input device or an output device from another computing device may be used as input device(s) 114 or output device(s) 112 for computing device 102.

Components of computing device 102 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 102 may be interconnected by a network. For example, memory 108 may be comprised of multiple physical memory units located in different physical locations interconnected by a network.

Those skilled in the art will realize that storage devices utilized to store computer readable instructions may be distributed across a network. For example, a computing device 120 accessible via network 118 may store computer readable instructions to implement one or more embodiments provided herein. Computing device 102 may access computing device 120 and download a part or all of the computer readable instructions for execution. Alternatively, computing device 102 may download pieces of the computer readable instructions, as needed, or some instructions may be executed at computing device 102 and some at computing device 120.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of bidirectionally synchronizing a web browser cache of a web browser on a computer having a processor with a remote web browser cache of a remote computer, the method comprising:
executing on the processor instructions configured to:
upon detecting a writing of at least one data object in the web browser cache, synchronize the web browser cache with the remote web browser cache of the remote computer; and
upon receiving from the remote computer an update of at least one data object of the remote web browser cache, the data object received from a webserver:
write the update to the web browser cache; and
upon receiving a request from a user of the computer to access the data object from the webserver, provide the data object from the web browser cache.

2. The method of claim 1, the instructions configured to, upon receiving a notification from the remote computer to synchronize the browser cache with the remote store, synchronize the browser cache with the remote store.

3. The method of claim 1, the instructions configured to:
detect a removing of at least one removed data object in the browser cache, and
notify the remote computer to remove the removed data object from the remote store.

4. The method of claim 1, the instructions configured to synchronize between the browser cache and the remote store data objects matching at least one synchronized data object criterion.

5. The method of claim 1, the instructions configured to synchronize the browser cache with the remote store according to at least one synchronization policy.

6. The method of claim 5, at least one synchronization policy selected from a set of synchronization policies comprising:
a synchronization triggering policy;
a synchronization type policy;
a data object comparing policy;
a data object type merging policy; and
a data object conflict resolution policy.

7. The method of claim 5, at least one synchronization policy defined by the remote computer.

8. The method of claim 1, the instructions configured to execute on the computer within the browser.

9. The method of claim 1, the instructions configured to execute on the computer as a process outside of the browser.

10. The method of claim 1:
the browser cache included in a computing environment of the computer, and
the at least one data object stored in the computing environment of the computer.

11. The method of claim 10:
the computing environment comprising a deployable computing environment;
the remote computer comprising a computing environment host configured to manage the computing environment; and
the computer comprising a computing environment component configured to synchronize the computing environment with the computing environment host.

12. The method of claim 1, the instructions configured to expose to other applications of the computing environment a synchronization programmatic interface comprising:
at least one synchronization policy disclosing operation configured to disclose at least one property of at least one synchronization policy, and
at least one synchronization policy setting operating configured to set at least one property of at least one synchronization policy.

13. The method of claim 12, the synchronization programmatic interface comprising a synchronization invoking operation configured to invoke the browser cache synchronizing component to synchronize the browser cache with the remote store.

14. The method of claim 1, at least one data object stored in the browser cache comprising an application resource associated with an application configured to execute in the browser.

15. The method of claim 14:
the data object comprising an application installer package, and
the instructions configured to, upon receiving the data object from the remote computer, invoke the application installer package to install the application.

16. The method of claim 14, the application associated with an application host and configured to execute in an application host connection context selected from a set of application host connection contexts comprising a connected context and a disconnected context.

17. The method of claim 16:
the data object comprising an offline application resource, and
the application configured to use the offline application resource when the application executes in a disconnected context.

18. A computer-readable storage medium comprising processor-executable instructions configured to, when executed on a processor of a computer having a computing environment, bidirectionally synchronize a web browser cache of a web browser on a computer with a remote web browser cache of a remote computer by:
upon detecting a writing of at least one data object in the web browser cache, synchronize the web browser cache with the remote web browser cache of the remote computer; and
upon receiving from the remote computer an update of at least one data object of the remote web browser cache, the data object received from a webserver:
write the update to the web browser cache; and
upon receiving a request from a user of the computer to access the data object from the webserver, provide the data object from the web browser cache.

19. A method of bidirectionally synchronizing a browser cache of a browser on a computer having a processor and a deployable computing environment with a remote store of a remote computer comprising a computing environment host configured to manage the computing environment, the method comprising:
executing on the processor instructions configured to:
detect a writing of at least one data object in the browser cache including a removing of at least one removed data object in the browser cache;
upon detecting the writing, synchronize data objects in the browser cache matching at least one synchronized data object criterion with the remote store according to at least one synchronization policy;

upon receiving a notification from the remote computer to synchronize the browser cache with the remote store, synchronize data objects in the browser cache matching at least one synchronized data object criterion with the remote store according to at least one synchronization policy defined by the remote computer;

upon receiving a request from a user of the computer to access the data object from the webserver, provide the data object from the web browser cache; and expose to applications a synchronization programmatic interface comprising:
- at least one synchronization policy disclosing operation configured to disclose at least one property of at least one synchronization policy;
- at least one synchronization policy setting operating configured to set at least one property of at least one synchronization policy; and
- a synchronization invoking operation configured to invoke the browser cache synchronizing component to synchronize the browser cache with the remote store.

20. The method of claim 1:

synchronizing the web browser cache comprising: upon detecting a writing of at least one data object in the web browser cache generated by the computer, synchronize the web browser cache with the remote web browser cache of the remote computer; and writing the update to the web browser cache comprising: upon receiving from the remote computer an update of at least one data object of the remote web browser cache generated by the remote computer, write the update to the web browser cache.

* * * * *